US012800079B2

(12) United States Patent
Baier et al.

(10) Patent No.: US 12,800,079 B2
(45) Date of Patent: Nov. 17, 2026

(54) PIPE ADAPTER

(71) Applicant: Crassus GmbH & Co. KG, Berlin (DE)

(72) Inventors: Lars Baier, Berlin (DE); Tom Baier, Berlin (DE); Jared Herrmann, Berlin (DE)

(73) Assignee: CRASSUS GMBH & CO. KG, Berlin (DE)

( * ) Notice: Subject to any disclaimer, the term of this patent is extended or adjusted under 35 U.S.C. 154(b) by 0 days.

(21) Appl. No.: 19/318,831

(22) Filed: Sep. 4, 2025

(65) Prior Publication Data

US 2026/0002616 A1 Jan. 1, 2026

Related U.S. Application Data

(62) Division of application No. 18/173,670, filed on Feb. 23, 2023, now abandoned.

(30) Foreign Application Priority Data

Mar. 21, 2022 (DE) ........................ 102022106528.6

(51) Int. Cl.
*F16L 25/14* (2006.01)
*F16L 37/107* (2006.01)

(52) U.S. Cl.
CPC ............. *F16L 25/14* (2013.01); *F16L 37/107* (2013.01)

(58) Field of Classification Search
CPC .............................. F16L 37/248; F16L 37/107
See application file for complete search history.

(56) References Cited

U.S. PATENT DOCUMENTS

| | | | | |
|---|---|---|---|---|
| 2,204,392 | A | 6/1940 | Arm | |
| 2,255,593 | A * | 9/1941 | Berger .................. | F16L 37/107 |
| 6,402,207 | B1 | 6/2002 | Segal et al. | |
| 9,127,795 | B2 | 9/2015 | Chan | |
| 2005/0206163 | A1 | 9/2005 | Guesnon et al. | |
| 2011/0193342 | A1 | 8/2011 | Hoefelmayr | |
| 2013/0320672 | A1 | 12/2013 | Steele | |
| 2015/0130181 | A1 | 5/2015 | Kremer et al. | |
| 2015/0306366 | A1 | 10/2015 | Lewis | |
| 2019/0351515 | A1 | 11/2019 | Stottlemyer, Jr. | |

FOREIGN PATENT DOCUMENTS

| | | | |
|---|---|---|---|
| CH | 643 644 | A5 | 6/1984 |
| DE | 102017219116 | A1 | 4/2019 |
| DE | 20 2019 101 773 | U1 | 5/2019 |
| EP | 3 689 077 | | 3/2019 |

OTHER PUBLICATIONS

German Office Action of application DE 10 2022 106 528.6, Nov. 22, 2022, 4 pages.

* cited by examiner

*Primary Examiner* — Zachary T Dragicevich
(74) *Attorney, Agent, or Firm* — Womble Bond Dickinson US LLP

(57) ABSTRACT

The invention relates to a pipe adapter (10) for connecting two pipe ends, comprising a first connecting member (12) to a first pipe end of a first pipe and a second connecting member (14) to a second pipe end of a second pipe. It is provided that the connecting members (12, 14) each comprises a connecting portion (16, 18) for connecting to the respective pipe end and a coupling portion (20, 22) for connecting the connecting members (12, 14) to each other.

6 Claims, 13 Drawing Sheets

A-A (1 : 1)

PIPE ADAPTER

CROSS-REFERENCE TO RELATED APPLICATIONS

This application is a divisional of U.S. patent application Ser. No. 18/173,670, filed Feb. 23, 2023, which claims priority to German Patent Application Number 102022106528.6, filed on Mar. 21, 2022, the entire contents of both of which are incorporated herein by reference.

BACKGROUND

1. Field

The invention relates to a pipe adapter for connecting two pipe ends, comprising a first connecting member connectable to a first pipe end of a first pipe and a second connecting member connectable to a second pipe end of a second pipe.

2. Description of the Related Art

Pipe adapters of the generic type are known.

EP 3 689 077 A1 discloses a pipe adapter for connecting two pipe ends or one pipe end to a bore hole. The pipe adapter comprises a pipe having a first pipe section with a first pipe end and having a second pipe section with a second pipe end. A middle section is provided between the first pipe section and the second pipe section. The pipe adapter is formed in one piece.

The disadvantage of the known pipe adapters is that they cannot be used flexibly in different installation situations. Due to the one-piece design, the two tube ends to be connected must have a minimum distance in order to place the pipe adapter. Then at least one of the pipes must be displaced axially.

Particularly in the case of repair work with pipes that have already been laid, the known pipe adapters can only be used to disadvantage.

SUMMARY

The object of the invention is to create a pipe adapter of the type described, which is of simple design and which can be used flexibly in different installation situations.

According to the invention, this object is solved by a pipe adapter having the features mentioned in claim 1. In that the connecting members each comprise a connecting section for connecting to the respective pipe end and a coupling section for connecting the connecting members to one another, it is advantageously possible to form the pipe adapter in at least two parts and only complete it on site to form the entire pipe adapter. This makes it possible, in particular, to use pipe adapters when connecting two pipe ends of two pipes whose pipe ends have a smaller distance from one another than the overall length of the pipe adapter. On site, the at least two connecting members can each be connected to one pipe end of a pipe and then connected to each other with their coupling sections.

In a preferred embodiment of the invention, it is provided that the coupling sections have coupling elements for the non-positive and/or positive connection of the connecting members to one another. These coupling elements are preferably formed in the manner of a bayonet lock. This makes it possible in a simple manner to partially assemble each of the connecting members so that they can then be connected to one another in a simple manner.

In a further preferred embodiment of the invention, it is provided that the connecting sections of the connecting members have different diameters for connecting pipes with different diameters. This makes it possible in a simple manner to connect a joint between two pipes with different diameters on site with the pipe adapter, in which the correspondingly suitable connecting members are selected, inserted and connected to one another. In a further preferred embodiment of the invention, the coupling sections of the connecting members have an identical diameter, so that additional intermediate elements are not required for adapting the different diameters.

Furthermore, in a preferred embodiment of the invention, it is provided that the connecting sections are arranged eccentrically to a longitudinal axis of the respective connecting member. This makes it possible in a simple manner to connect two pipe ends of two pipes which are not only spaced apart from one another but are arranged offset from one another in their longitudinal axes. According to the degree of eccentricity between the connecting section and the longitudinal axis of the connecting member, it is possible to react to a different offset in a simple manner.

In a further preferred embodiment of the invention, it is provided that the pipe adapter comprises at least one intermediate ring which has a first coupling element for connection to the first coupling element and a second coupling element for connection to the second coupling element. This makes it advantageously possible, by using at least one or optionally more intermediate rings, to also connect pipe ends of two pipes that are at a greater distance from one another. The intermediate rings can be connected to the respective coupling elements in a simple manner on site. The coupling elements of the intermediate rings are formed in the manner of a bayonet lock.

Furthermore, in a preferred embodiment of the invention, it is provided that the first connecting member and the second connecting member are of identical design, at least in the region of the coupling sections. This makes it possible in a simple manner to form the connecting members in such a way that it is not necessary to use differently constructed connecting members to achieve a pipe adapter, but rather to select these exclusively according to the diameter of the pipes to be connected and the position of the pipes to be connected. Due to the identical design, in particular of the coupling sections, these can then always be connected to each other in a secure manner positively or non-positively.

In a further preferred embodiment of the invention, it is provided that the connecting sections of the connecting members are smaller in diameter than the diameters of the pipe ends of the pipes to be connected. This makes it possible to insert the connecting members with their connecting sections into the pipe ends. This allows particularly simple assembly without additional clamping elements or the like.

Furthermore, in a preferred embodiment of the invention, it is provided that the connecting sections comprise at least one sealing element which is preferably arranged over the outer circumference of the connecting section. This advantageously enables a tight connection of the pipe ends by means of the pipe adapter according to the invention in a simple manner.

Furthermore, in a further preferred embodiment of the invention, it is provided that the pipe adapter comprises at least one securing element which is associated with the coupling sections of the connecting members. This advantageously makes it possible that when the two connecting members are connected positively or non-positively, preferably in the manner of a bayonet lock, this connection can be secured against unintentional release. Without active removal of the securing element, it is thus not possible to uncouple the connecting members. In this way, the joint between the pipe ends of the pipes to be connected, realized by the pipe adapter, is secured against accidental opening. Particularly in the case of shoring in the ground, accidental loosening of the pipe adapter due to earth movement or the like can thus be avoided.

Further preferred embodiments of the invention result from the other features mentioned in the subclaims.

The invention is explained in more detail below in embodiment examples with reference to the accompanying drawings. They show:

DETAILED DESCRIPTION

Figure 1B:
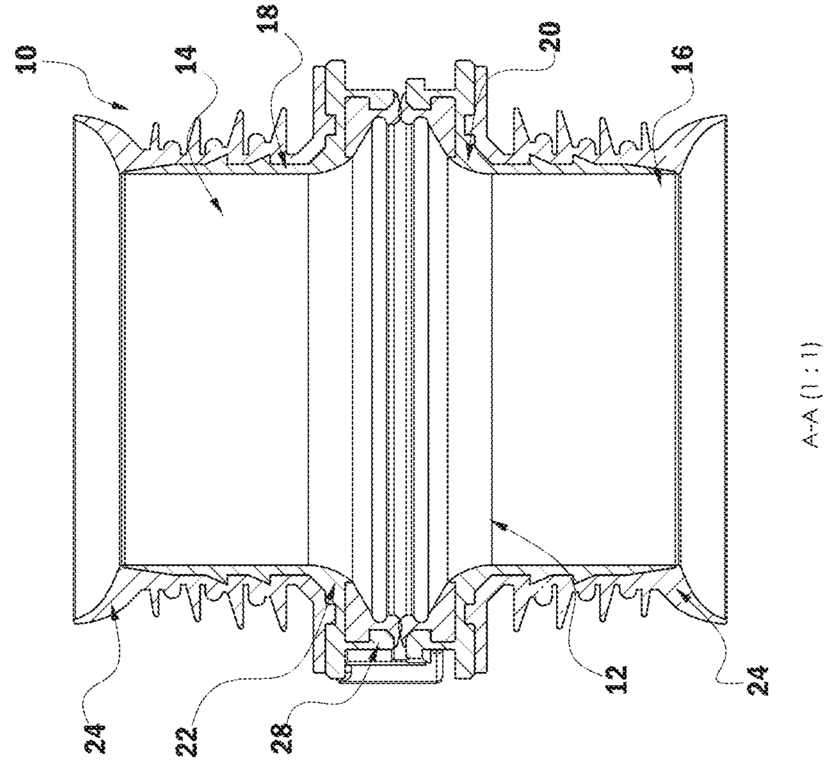
FIGS. 1A and 1B a pipe adapter in a schematic perspective view and in a sectional view.
Figure 1A:
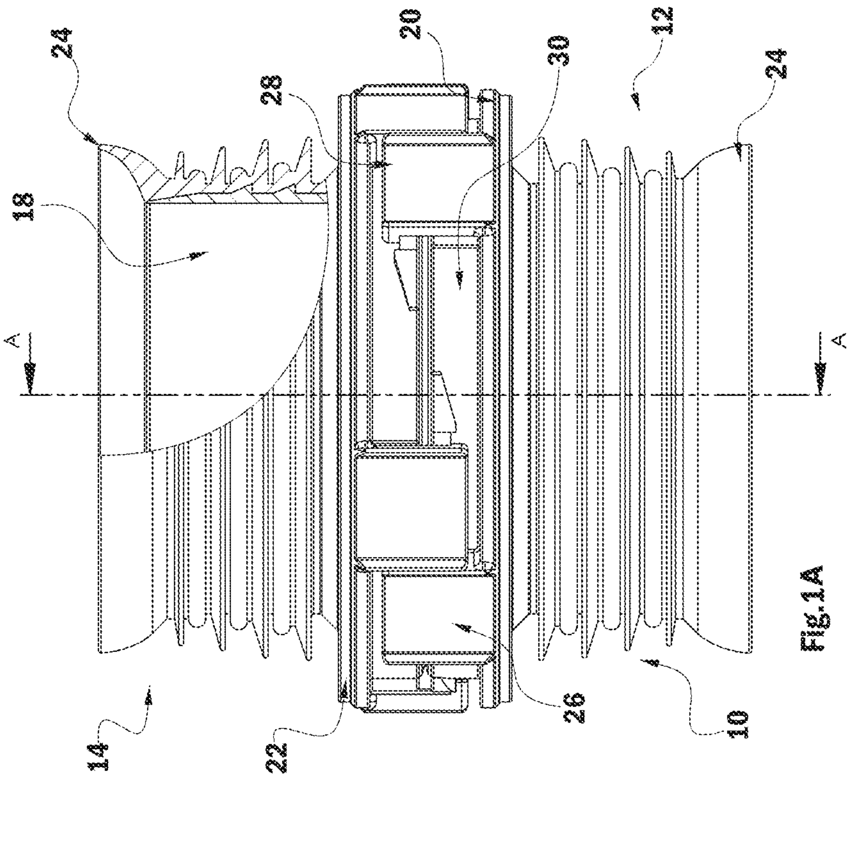

FIG. 1 shows a pipe adapter designated 10 in its entirety. The pipe adapter 10 comprises a first connecting member 12 and a second connecting member 14. The connecting members 12 and 14 each consist of a connecting section 16 and 18, respectively, and of a coupling section 20 and 22, respectively.

The connecting sections 16 and 18 are each surrounded by a sealing element 24 in the form of a sealing sleeve. The sealing element 24 consists of an elastic material and is pushed onto the connecting sections 16 and 18. The outer diameter of the connecting sections 16 and 18 and the inner diameter of the sealing elements 24 are matched to each other in such a way that, after the sealing elements 24 have been pushed onto the connecting sections 16 and 18, they are fixed there in a self-locking manner.

The coupling sections 20 and 22, respectively, comprise coupling elements 26 and 28, respectively. According to the embodiment example shown, each of the connecting members 12 and 14, respectively, has four coupling elements 26 and four coupling elements 28, respectively, which are arranged evenly over the circumference of the connecting members 12. The number of coupling elements 26, 28 can also be less or more than four. The coupling elements 26 of the connecting member 12 can be connected to the coupling element 28 of the connecting member 14 in a non-positive and/or positive manner in the manner of a bayonet lock. By relative rotation of the connecting members 12 and 14 with respect to each other, the connection to the complete pipe adapter 10 is made.

The structure and mode of operation of the coupling sections 20 and 22 will be discussed in more detail with reference the following figures.

The pipe adapter 10 shown in FIG. 1 has the following function:

The pipe adapter 10 is used to connect two pipe ends of two pipes. The pipes with their pipe ends are not shown in FIG. 1.

The pipe adapter 10 thus initially consists of the two connecting members 12 and 14, each with sealing elements 24 pushed on.

The connecting member 12 is then first inserted into one pipe end of a first pipe until one end face of this pipe end comes into abutting contact with the coupling section 20.

Depending on the installation situation of the pipes to be connected, the second connecting member 14 is then inserted into the pipe end of the second pipe.

The coupling sections 20 or 22 are then brought into engagement with each other and then connected to each other by twisting—by 90° according to the embodiment shown—in a positive and/or non-positive manner.

Figure 12B:
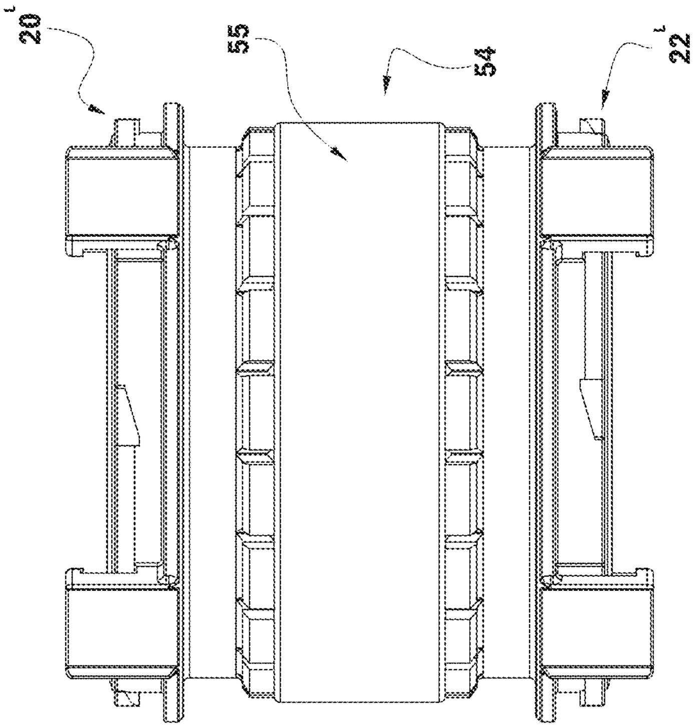
Figure 12A:
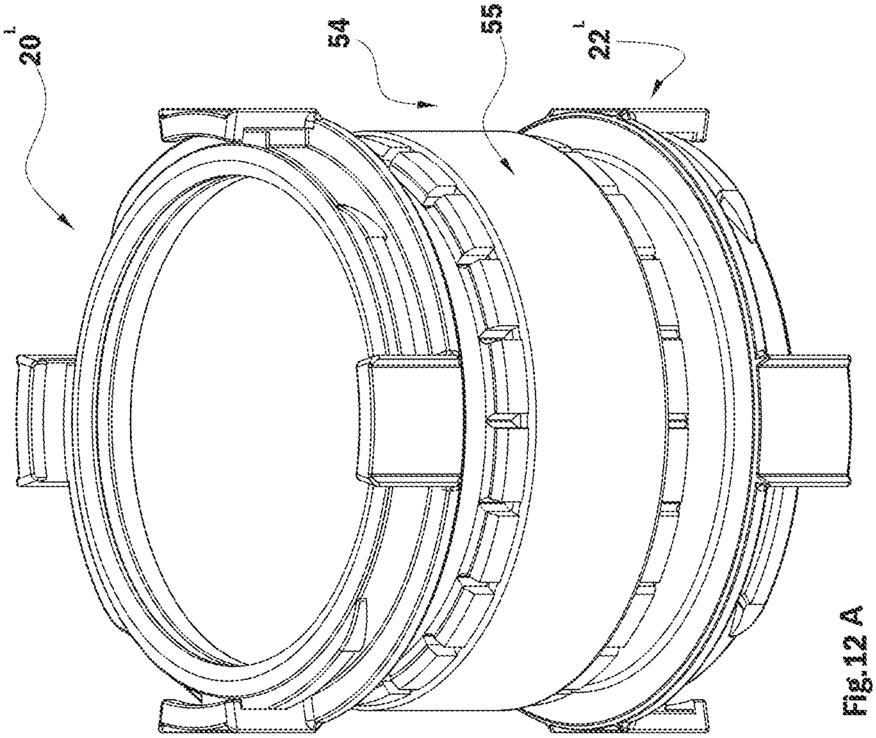

This connection is then locked by locking elements shown in more detail in FIG. 12, each of which is inserted, preferably clipped, into the free space 30 visible in FIG. 1 between adjacent coupling elements 26 and 28. This makes it possible to untwist, i.e. release, the positive and/or non-positive connection between the coupling elements 12 and 14 only by deliberately removing the locking elements from the free spaces 30.

The pipe adapter 10 can therefore be used very flexibly. In the case of pipes already laid in the ground, for example, where a joint between two adjacent pipes is to be repaired, only a relatively small amount of construction clearance is required for the insertion of the pipe adapter 10.

In the case of a new pipe installation, the pipe adapter 10 can first be completed and then the two pipe ends are fitted onto the sealing elements 24.

Figure 2B:
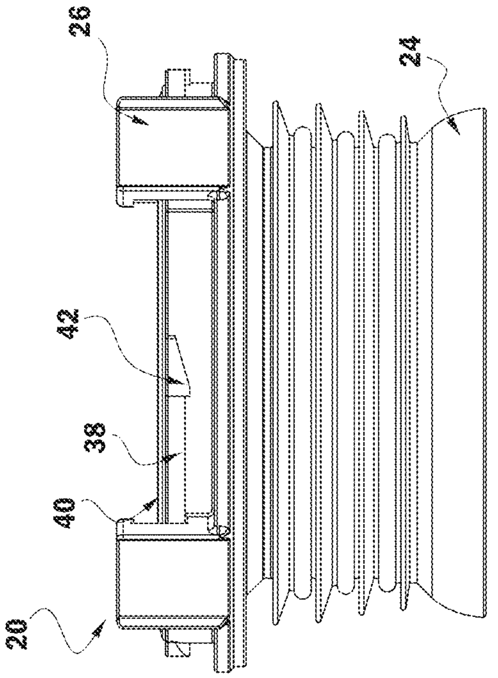
FIGS. 2A and 2B a connecting member of the pipe adapter in a schematic perspective view and a sectional view.
Figure 2A:
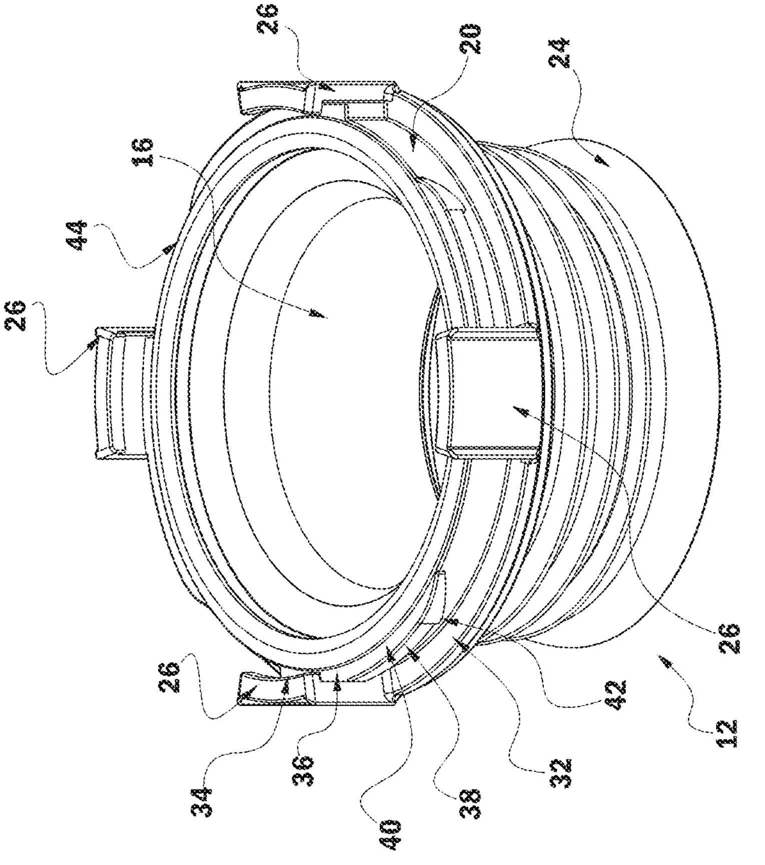

FIG. 2 shows a single connecting member 12. The same parts as in FIG. 1 are marked with the same reference numerals and are not explained again.

Referring to the illustration in FIG. 2, the structure of the coupling section 20 is clarified.

The coupling section 20 has a circumferential annular collar 32 from which the coupling elements 26 extend axially. Four coupling elements 26 are provided, arranged uniformly over the entire circumference of the annular collar 32. On their side facing away from the annular collar 32, the coupling elements 26 have a shoulder 34 which results in the formation of a free space 36 between the shoulder 34 and the annular collar 32. Within this free space 36, a guide section 38 is associated with each coupling element 26. The guide section 38 has a guide surface 40 and a latching lug 42 on the side opposite the guide surface 40.

FIG. 2 illustrates that the connecting member 12 has a sealing ring 44 on its upper end face.

The connecting members 12 and 14—as shown in FIG. 1—are of identical construction. This means that the connecting member 12 and the connecting member 14 have exactly the same structure as shown in FIG. 2 on the basis of the connecting member 12.

To assemble the connecting members 12 and 14 into the pipe adapter 10, they are first inserted into each other with the coupling sections 20 and 22 facing each other. The coupling elements 26 first move axially into the region that remains free between the guide element 38 and the adjacent coupling element 26. The respective guide surfaces 40 come into abutting contact here. By subsequently twisting the connecting members 12 and 14 relative to each other, the guide elements 38 initially enter the respective free spaces 36 of the respectively assigned coupling element 26 of the other connecting member. The twisting is carried out until the coupling elements 26 or 28 of the two connecting members 12 and 14 abut each other. In this position, the guide elements 38 have completely penetrated the respective free spaces 36 and engage behind the associated coupling elements 26 of the other connecting member with their latching lugs 42.

The sealing ring 44 or, if applicable, the sealing rings 44 ensure a tight connection between the two connecting members 12 and 14.

Figure 3B:
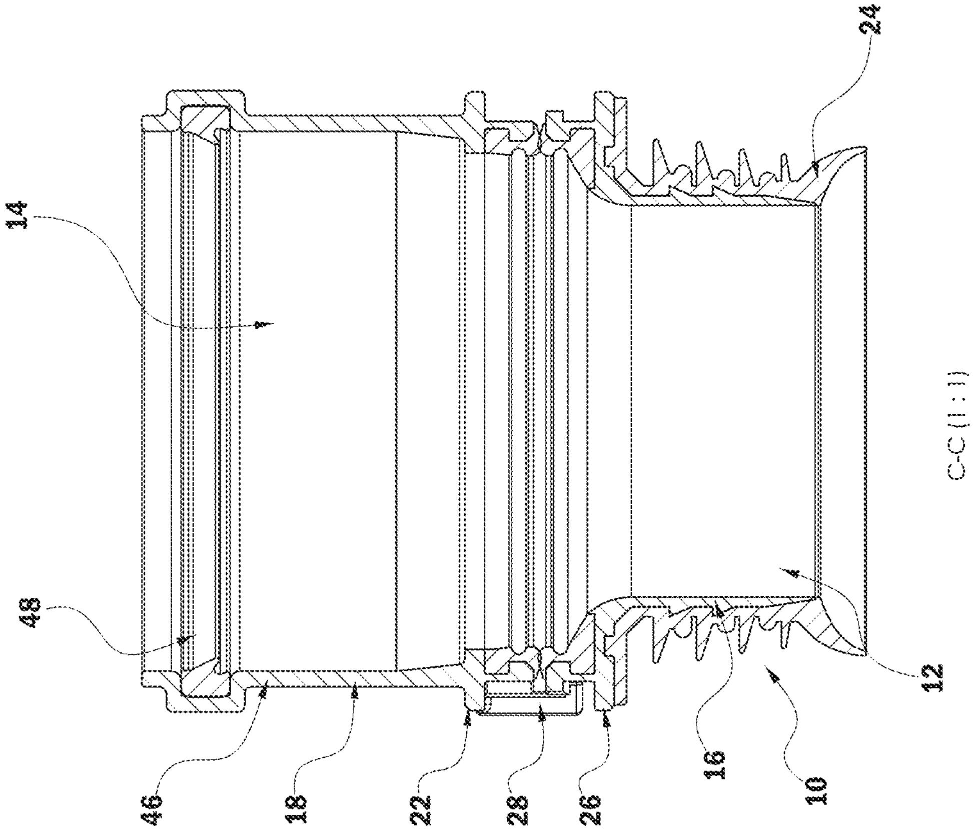
FIGS. 3A and 3B and 4A and 4B cross-sectional views of the pipe adapter in further exemplary embodiments.
Figure 3A:
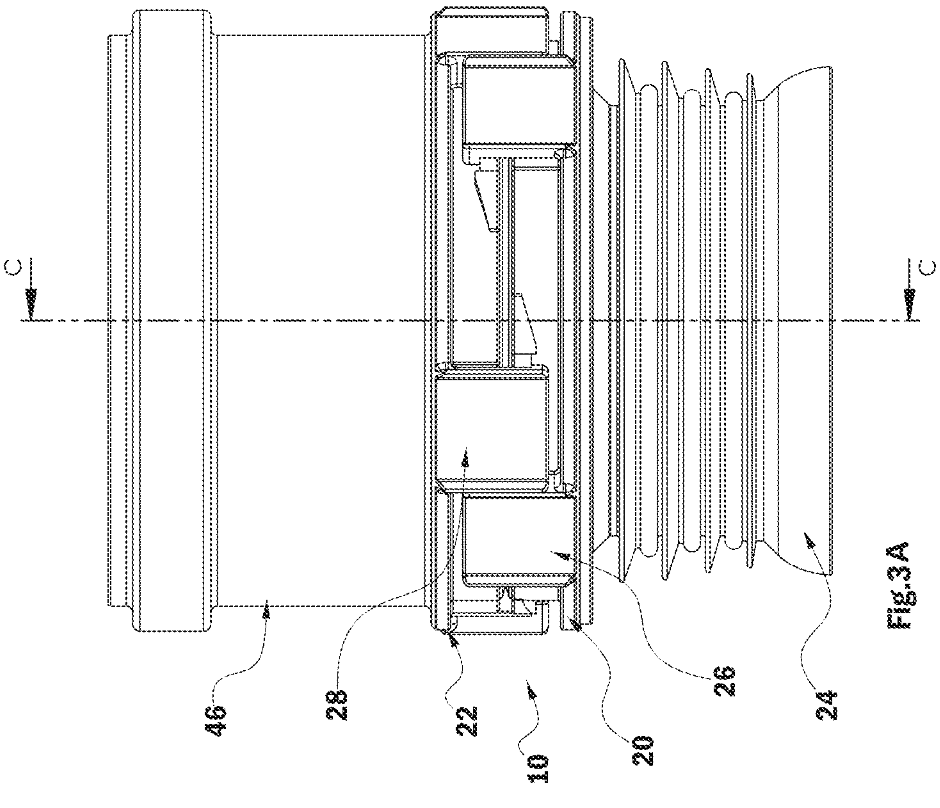

FIG. 3 shows a pipe adapter 10 in a modified embodiment. The connecting member 12 shows the structure already explained with reference to the previous figures.

The connecting member 14 is designed here as a sleeve 46. This means that the connecting section 18 of the connecting member 14 is not inserted into a second pipe end of a second pipe, but grips around it from the outside. The sleeve 46 is provided here with an internal sealing element 48. The coupling section 22 of the sleeve 46 is again identically formed, as already explained with reference to the present figures.

Figure 4B:
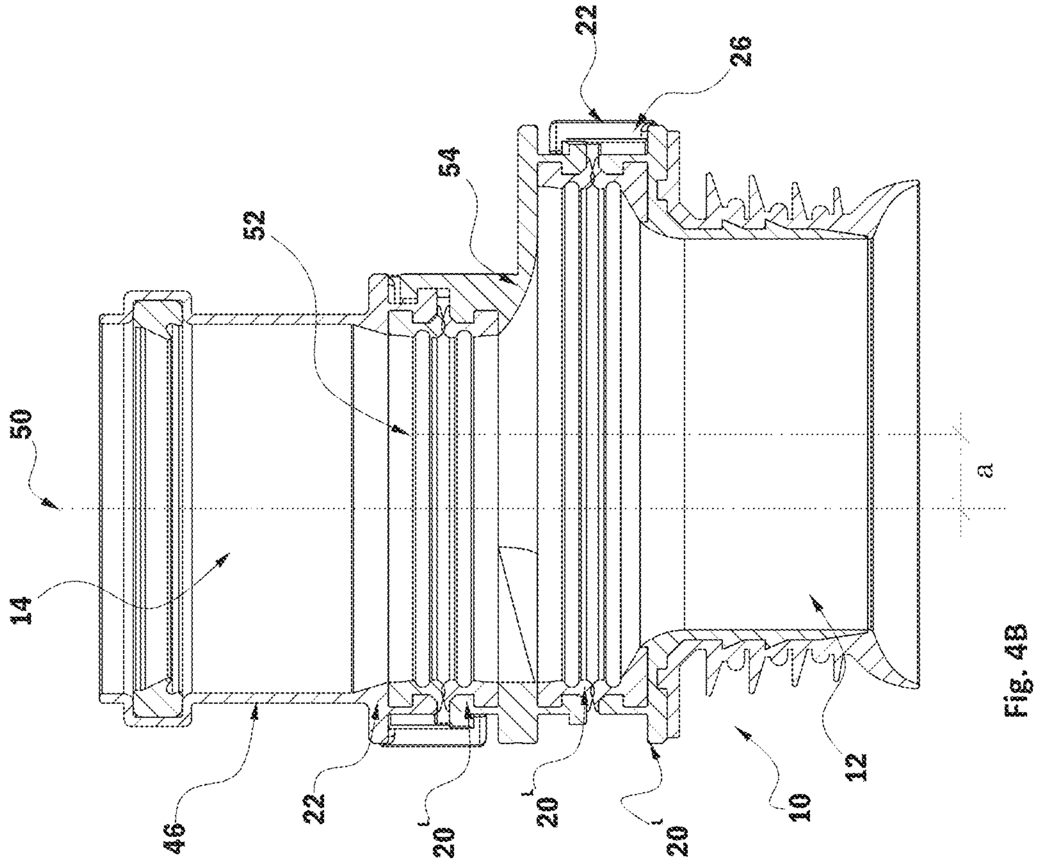
Figure 4A:
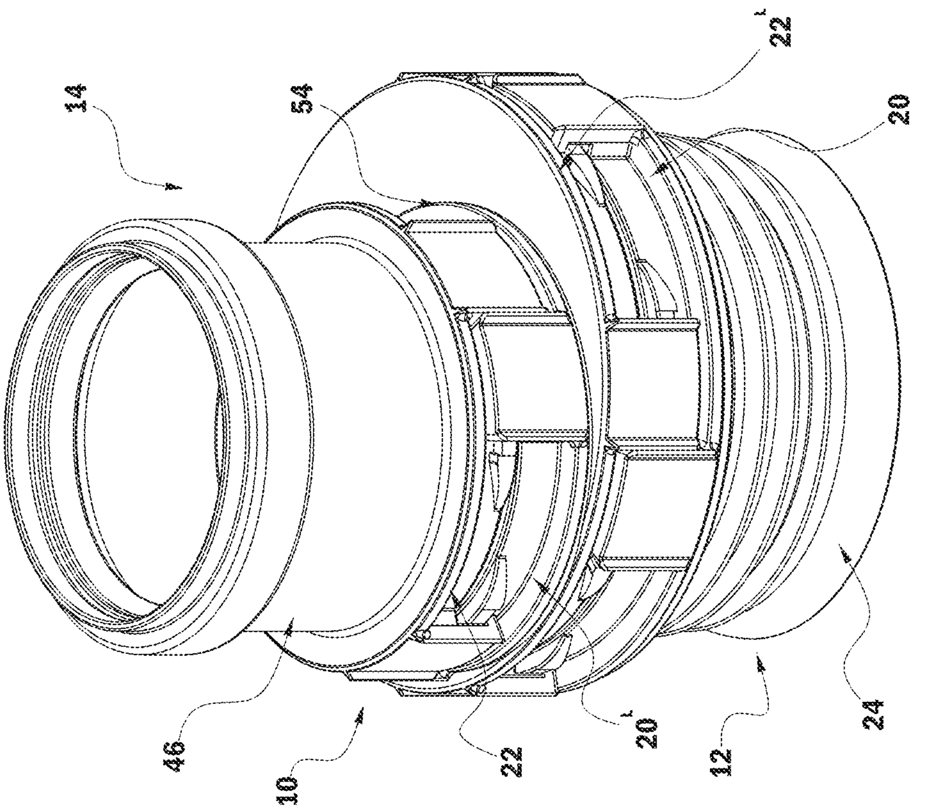

FIG. 4 shows a further embodiment of a pipe adapter 10. The connecting member 12 has the structure explained with reference to FIG. 2.

The connecting member 14 is again designed as a sleeve 46.

In the embodiment shown in FIG. 4, the connecting member 14 is smaller in diameter than the connecting member 12. This means that pipes with different nominal diameters can be connected to each other with the embodiment of the pipe adapter 10 shown in FIG. 4.

As FIG. 4 further illustrates, a longitudinal axis 50 of the connecting member 14 is eccentric to a longitudinal axis 52 of the connecting member 12.

The resulting distance a between the longitudinal axes 50 and 52 makes it possible to use the pipe adapter 10 to connect pipes that are not only spaced apart, but also have a lateral offset.

The pipe adapter 10 shown in FIG. 4 further comprises an intermediate ring 54. The intermediate ring 54 has a coupling portion 22' which is complementary to the coupling portion 20 of the connecting member 12. Further, the intermediate ring 54 has a coupling portion 20' that is formed complementarily to the coupling portion 22 of the connecting member 14.

The structure and mode of operation of the coupling sections 20' and 22' correspond to those already described in more detail in FIG. 2.

In the exemplary embodiment shown in FIG. 4, the intermediate ring 54 exhibits the following two functions.

First of all, the intermediate ring 54 serves to reduce the diameter of the connecting member 12 to the diameter of the connecting member 14. Furthermore, the total overall length of the pipe adapter 10 is increased by the intermediate ring 54 in accordance with its linear expansion. This means that the pipe adapter 10 can also be used to connect pipe ends that are at different distances from one another in a simple and advantageous manner.

Depending on the distance found, either intermediate rings 54 with different lengths or several intermediate rings can be connected together in the manner shown.

Figure 5B:
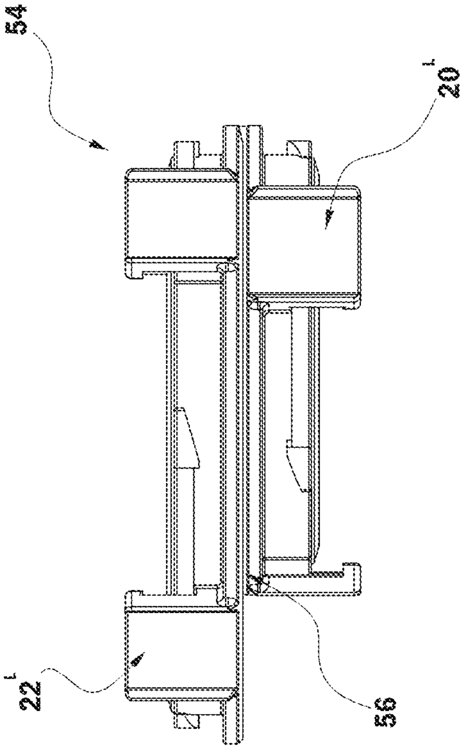
FIGS. 5A and 5B and 12A and 12B an intermediate ring for a pipe adapter in a schematic perspective view and a sectional view.
Figure 5A:
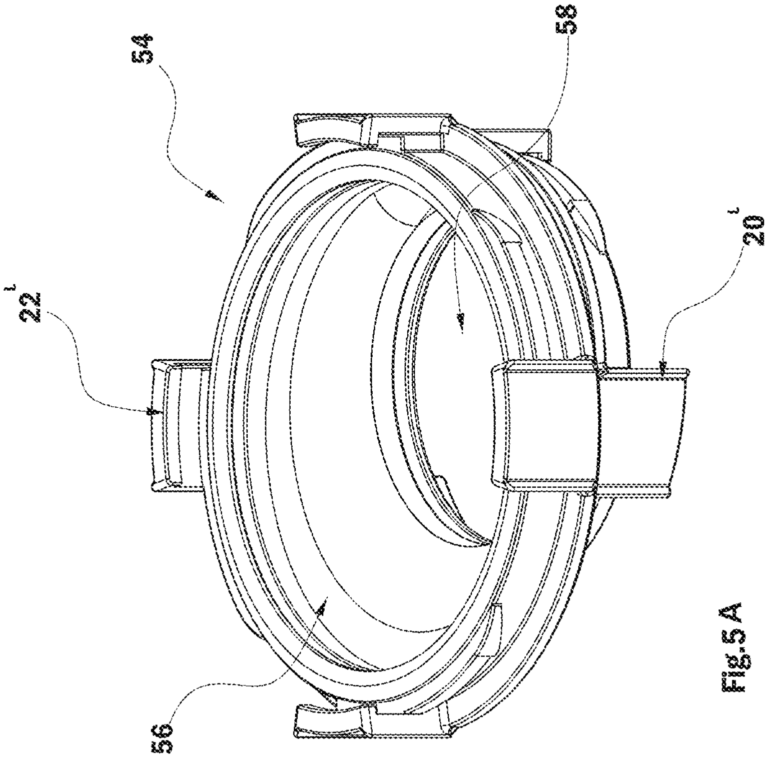

FIG. 5 shows an intermediate ring 54 in a schematic perspective view and in a sectional view. FIG. 5 clearly shows how the intermediate ring 54 enables a reduction of the nominal diameters from the connecting member 12 to the connecting member 14. For this purpose, the intermediate ring 54 has a connecting plane 56 from which the coupling section 22' on the one hand and the coupling section 20' on the other hand extend. The connecting plane 56 has a through opening 58 via which the reduction of the nominal diameter takes place.

FIG. 5 shows that the coupling section 20' is disposed eccentrically to the coupling section 22'.

In further embodiments, not shown, the connecting portion 20' may also be oriented coaxially with the connecting portion 22'.

Furthermore, according to further embodiments not shown, it is possible for the connecting plane 56 to be formed by a tubular section so that intermediate rings 54 with different overall lengths can be used.

Furthermore, it is possible that the intermediate ring 54 does not include a reduction of the nominal diameter, but that the coupling section 20' and the coupling section 22' are of the same size. In this case, the intermediate ring 54, for example in the embodiment shown in FIG. 1, can be used as an extension of the pipe adapter 10. Such an intermediate ring 54 is shown by way of example in FIG. 12. The central region 55 of the intermediate ring 54 can have different overall lengths. This central region also offers the possibility of providing further elements there, such as, for example, a fire protection insert element which, in the event of a fire, is capable of sealing off the pipe section. It is also possible to make the center section 55 at least partially transparent. This enables visual inspection. In a further variant, the center region 55 can be telescopic, which means that different construction lengths can be implemented in a simple manner. Finally, the central region 55 can also have a closable cleaning opening for access to the inside of the pipe.

FIGS. 6 to 11 show various embodiments of connecting members 12, each in a schematic perspective view and a sectional view.

Figure 6B:
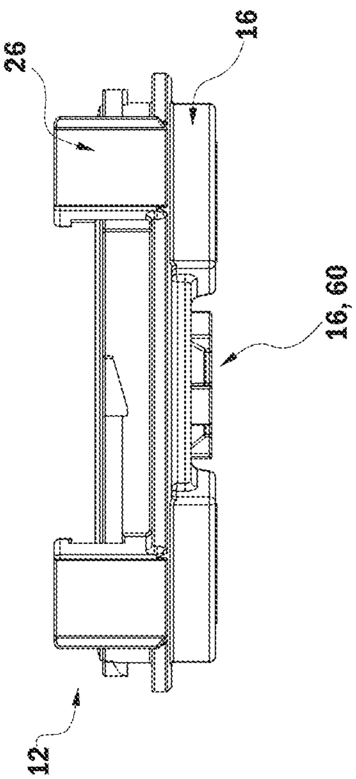
FIGS. 6A to 11B different design variants of connecting members for a pipe adapter each in a schematic perspective view and a sectional view FIGS. 13A and 13B a pipe adapter with a locking element.
Figure 6A:
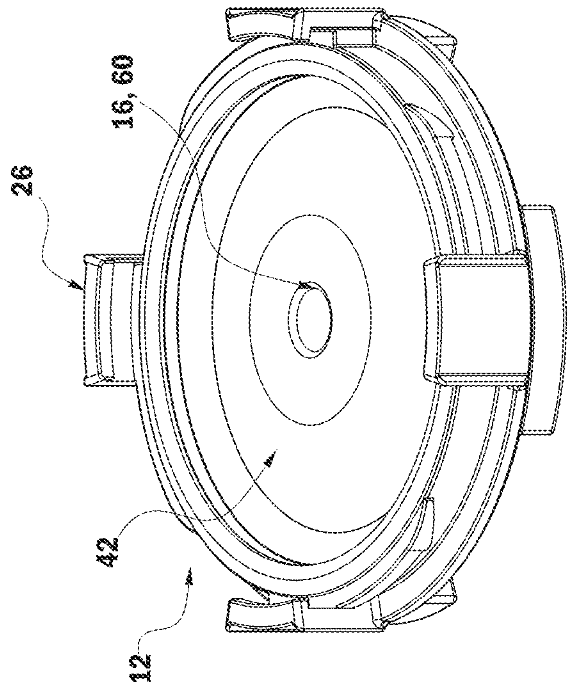

According to FIG. 6, the connecting member 12 is formed as a terminating element. This means that the connecting member 12 is completed with a connecting member 14 to form a pipe adapter 10, as shown for example in FIG. 1. The connecting section 16 is formed here by an internal thread 60 within a termination plate 62. This makes it possible to connect to the connecting member 12 of the pipe adapter 10 from the outside to the pipe adapter 10 a further element having a corresponding complemented external thread, either a pipe, water tap or the like.

FIGS. 7 to 10 show further different embodiments of a connecting member 12.

Parts identical to those in the previous figures are marked with the same reference numerals and are not explained again.

Figure 7B:
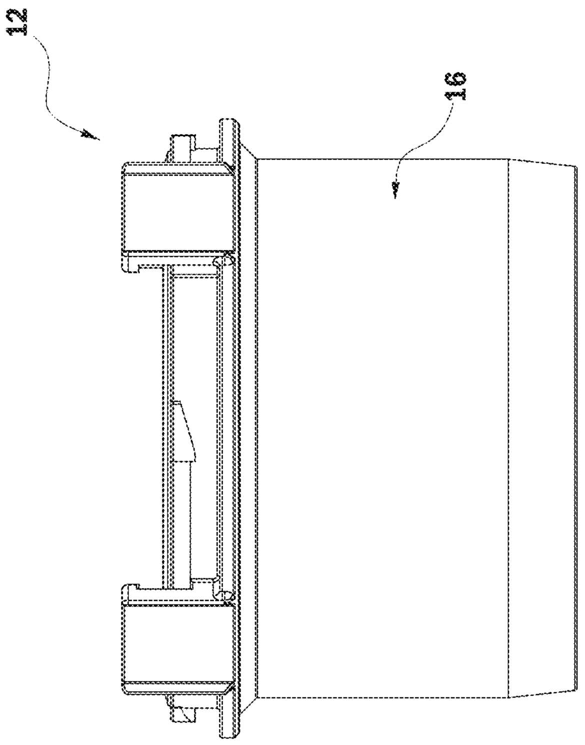
Figure 7A:
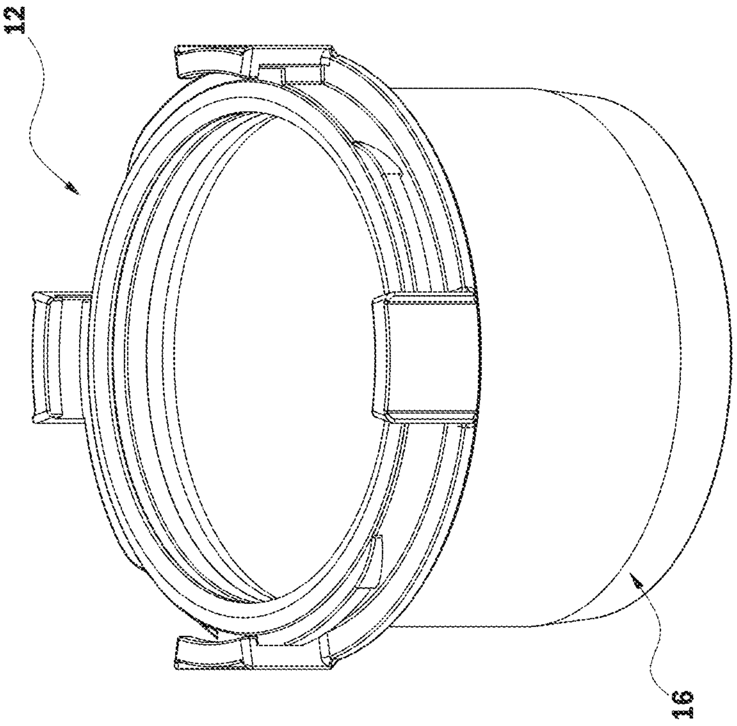

It is clear that the connecting members 12, but also the connecting members 14, can be formed in a variety of ways. FIG. 7 shows a variant in which the connecting section 16 is formed as a spigot end.

Figure 8B:
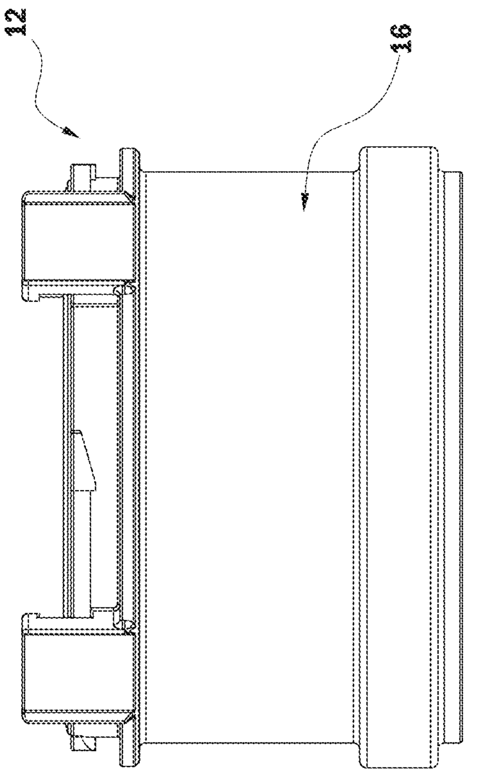
Figure 8A:
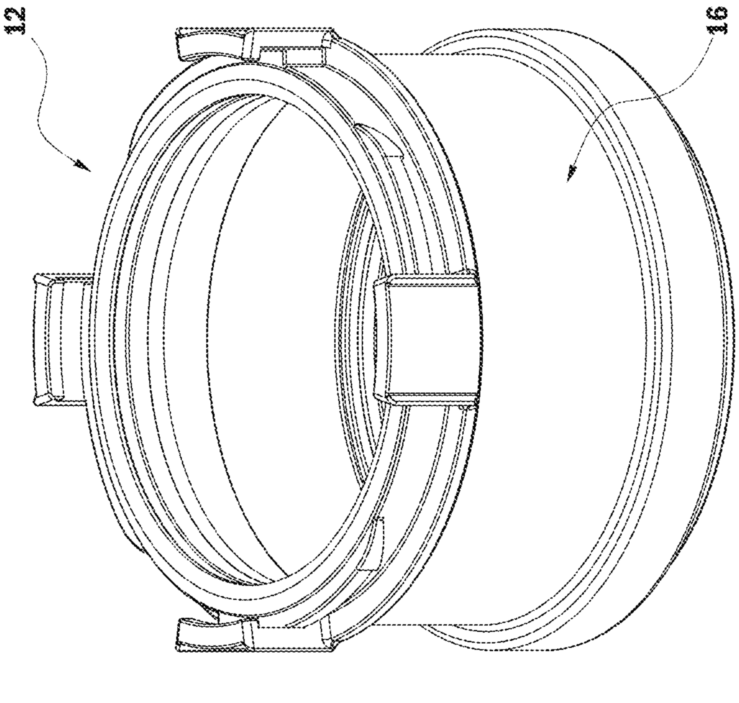

FIG. 8 shows a variant in which the connecting section 16 is formed as a sleeve.

Figure 9B:
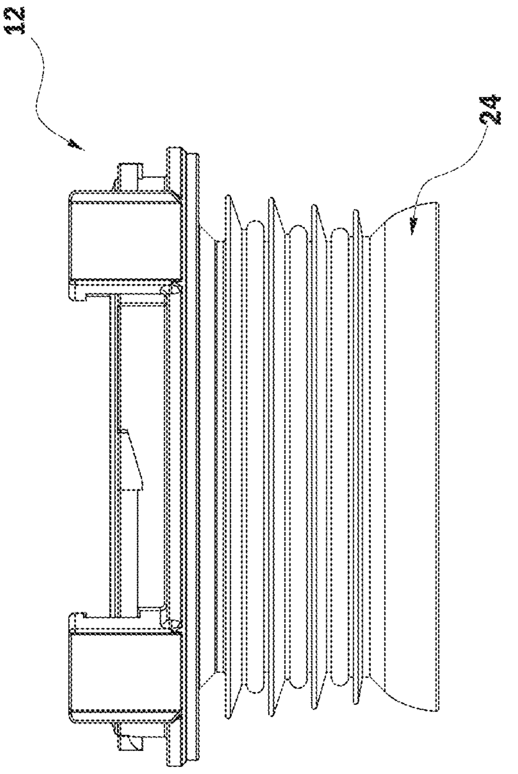
Figure 9A:
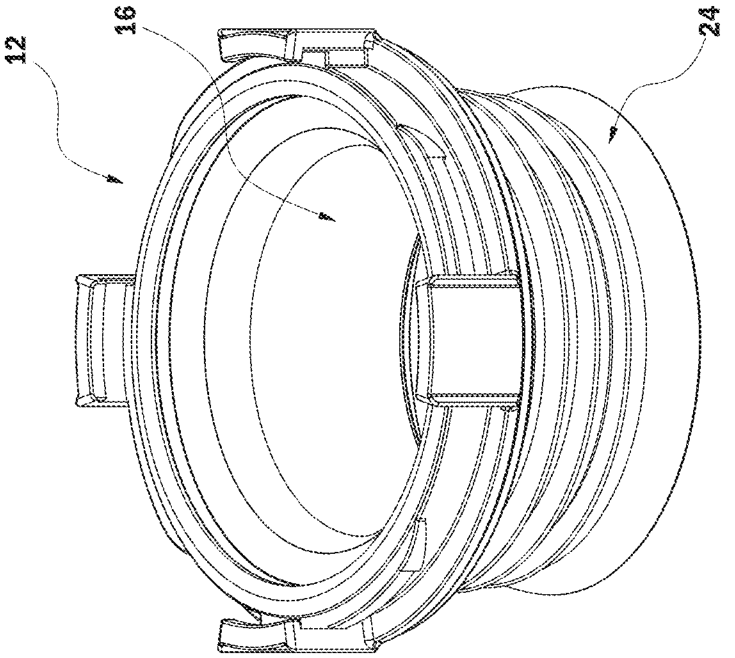

FIG. 9 shows a variant in which the connecting section 16 is surrounded by a sealing sleeve (sealing element 24).

Figure 10B:
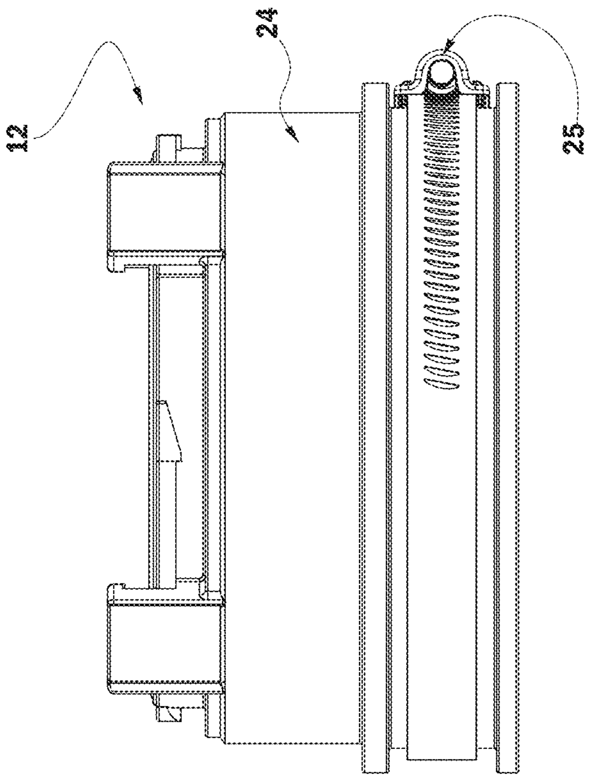
Figure 10A:
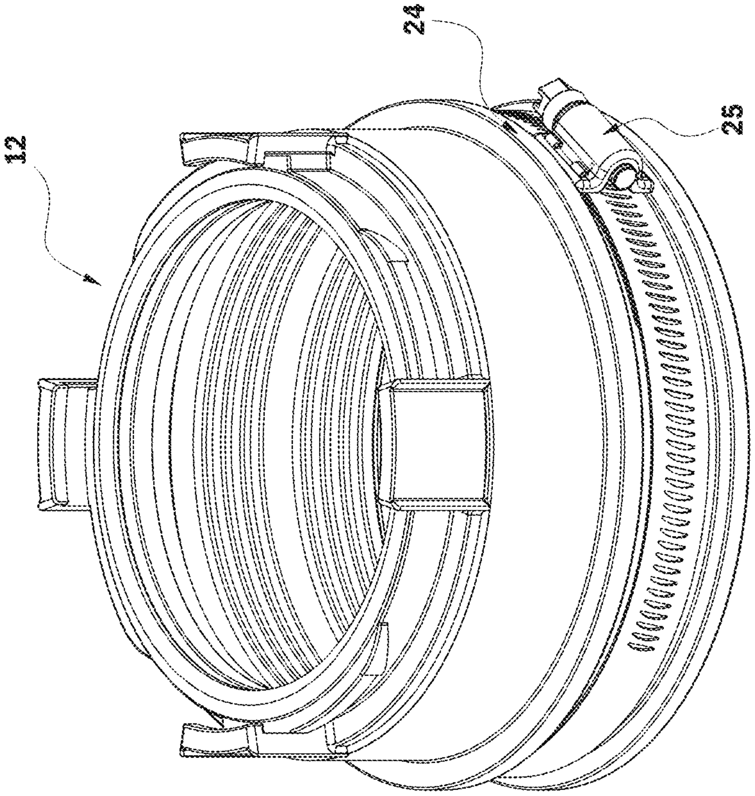

FIG. 10 shows a variant in which the connecting member 12 has a sealing sleeve in the form of a sleeve. This means that the connecting section 16 is itself formed by the sealing sleeve (sealing element 24). In this case, an additional clamping band 25 is provided, which enables a secure connection of the sealing sleeve to the pipe end.

Figure 11B:
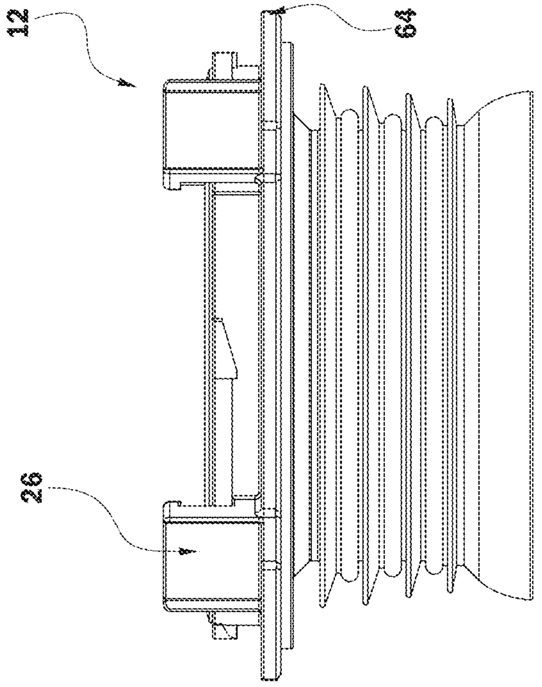
Figure 11A:
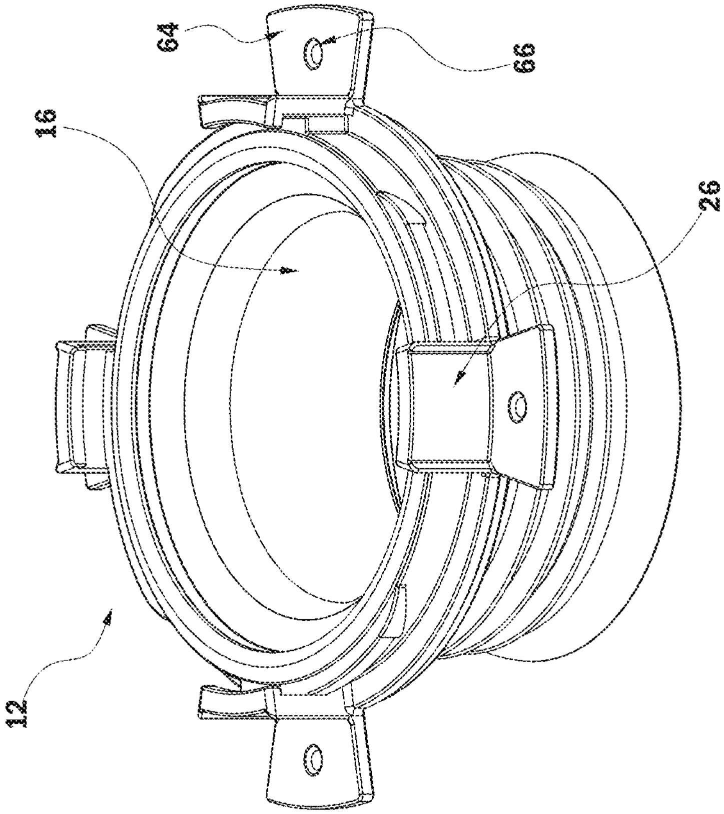

FIG. 11 shows an embodiment in which the coupling elements 26 additionally have radially projecting fastening lugs 64. These have a through-hole 66. This design of the coupling element 12 enables a bore hole of a monolithic wall to be equipped with the coupling element 12. Via fastening means, for example screws, the connecting member 12 is screwed to the wall. A further connecting member 14 is then attached to the coupling elements 26—in the manner already described—which is connected to a pipe end of a pipe.

Figure 13B:
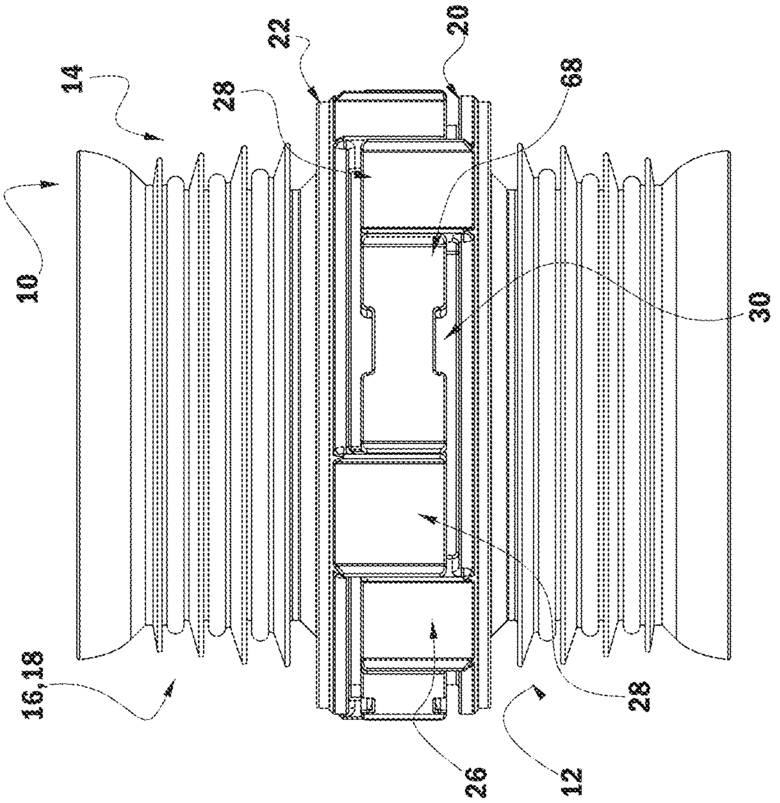
Figure 13A:
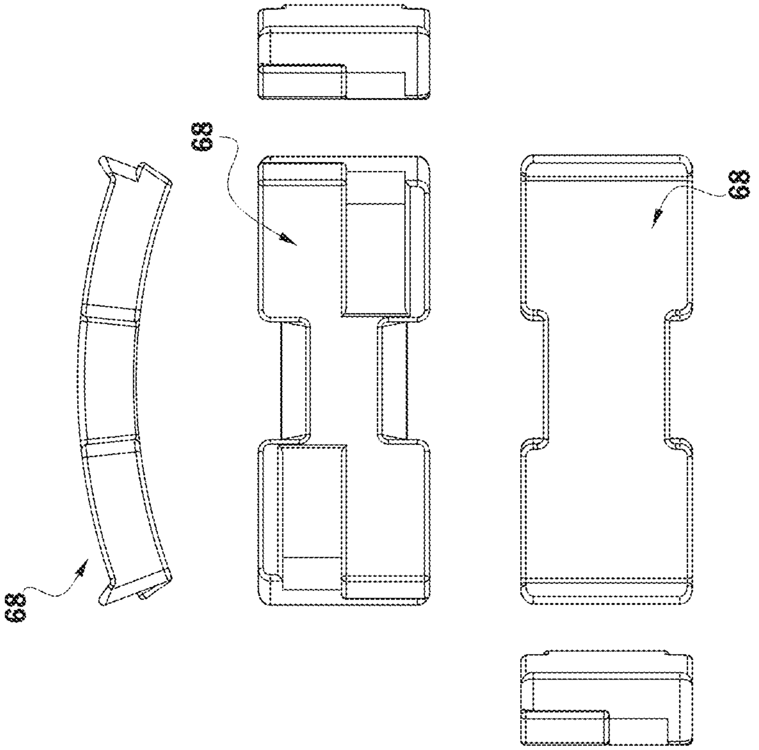

FIG. 13 again shows a complete pipe adapter 10 according to the structure already explained in FIG. 1. It is clear that a locking element 68 is inserted, in particular clipped, into each of the free spaces 30. This prevents the coupling elements 26 and 28 from unintentionally moving from their closed position shown in FIG. 13 to an open, possibly only partially open, position. Only after removal of the locking elements 68 is it possible to unscrew the pipe adapter 10.

The different variants of the connecting members 12 and 14 explained with reference to the previous figures can be combined with each other depending on the found or desired installation situation of the pipes to be connected or the pipe to be connected with a borehole. This means that different pipe diameters, different pipe spacings and different offsets of the pipes to be connected can be reacted to on site in a simple and flexible manner.

The invention thus also relates to a so-called kid, that is, a set of various of the previously explained connecting members 12, 14 or intermediate rings 54.

REFERENCE NUMERALS

10 pipe adapter
12 first connecting member
14 second connecting member
16 connecting section
18 connecting section
20 coupling section
20' coupling section
22 coupling section
22' coupling section
24 sealing element
26 coupling element
28 coupling element
30 free space
32 ring collar
34 shoulder
36 free space
38 guide section
40 guide surface
42 latching lug4
44 sealing ring
46 sleeve
48 sealing element
50 longitudinal axis
52 longitudinal axis
54 intermediate ring
56 connecting plane
58 through-hole
60 internal thread
62 termination plate
64 fastening lugs
66 through-hole
68 locking element

The invention claimed is:

1. A pipe adapter for connecting two pipe ends, the pipe adapter comprising:

a first connecting member connectable to a first pipe end of a first pipe; and a second connecting member connectable to a second pipe end of a second pipe, wherein the first and second connecting members each comprise a connecting portion for connecting to a respective pipe end of the first and second pipe ends and a coupling portion for connecting the first and second connecting members to each other, wherein each of the first connecting member and the second connecting member is a single piece, wherein the connecting portion of each of the first connecting member and the second connecting member overlaps the respective pipe end and forms a sealing connection by sealing elements with the respective pipe end, wherein the pipe adapter comprises at least one intermediate ring connectable between the first connecting member and the second connecting member, the at least one intermediate ring having first coupling sections for connecting to the first connecting member and second coupling sections for connecting to the second connecting member, and wherein a coupling portion of each of the first and second connecting members is configured to form a bayonet lock with a respective one of the first and second coupling sections of the at least one intermediate ring.

2. The pipe adapter according to claim 1, wherein a diameter of the connecting portion of the first connecting member is different than a diameter of the connecting portion of the second connecting member such that the first and second connecting members are configured for connecting pipes with different diameters.

3. The pipe adapter according to claim 1, wherein longitudinal axes of the first and second connecting members are arranged eccentrically with respect to each other at a distance (a).

4. The pipe adapter according to claim 1, wherein the sealing elements comprise a first sealing element associated with the connecting portion of each of the first and second connecting members and wherein the pipe adapter further comprises a second sealing element associated with the coupling section of each of the first and second connecting members.

5. The pipe adapter according to claim 1, wherein the intermediate ring has a connecting plane from which coupling portions extend and the connecting plane has a through-hole.

6. The pipe adapter according to claim 1, wherein at least one securing element is associated with the first and second connecting members.

* * * * *